No. 796,082. PATENTED AUG. 1, 1905.
N. LOFSTAM.
VEGETABLE SACKING DEVICE.
APPLICATION FILED SEPT. 26, 1904.
2 SHEETS—SHEET 2.
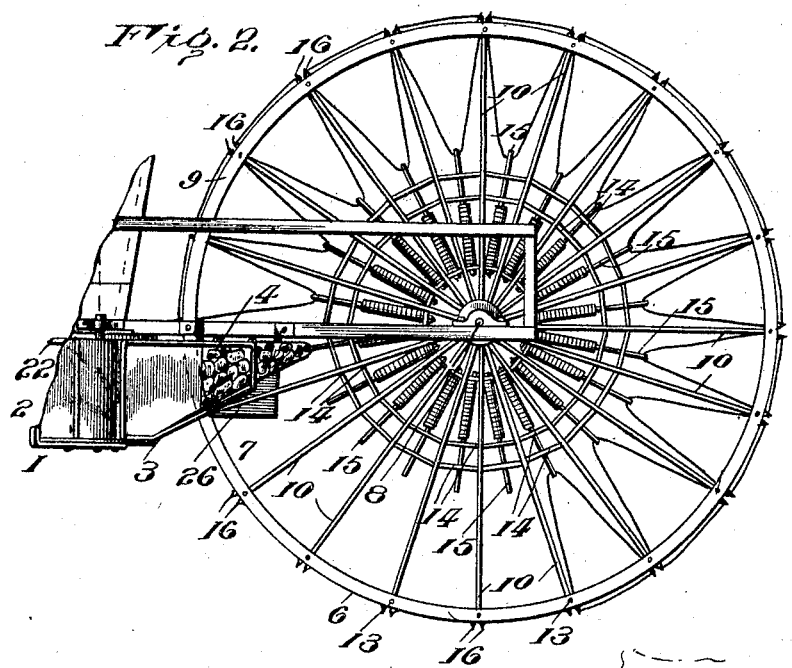
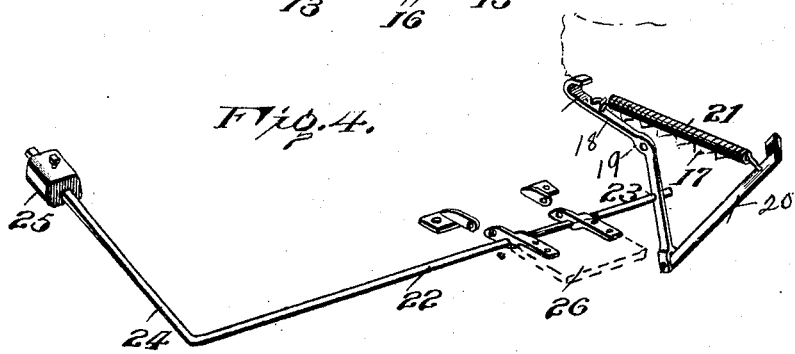
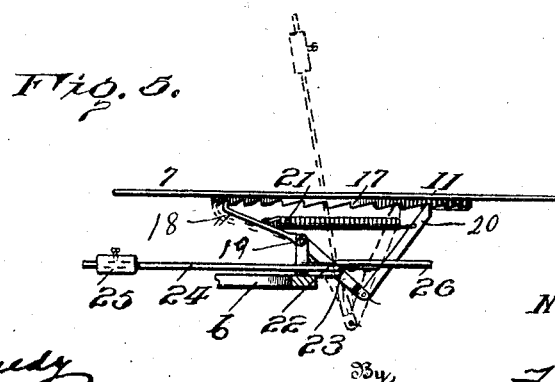
Inventor
Nels Lofstam

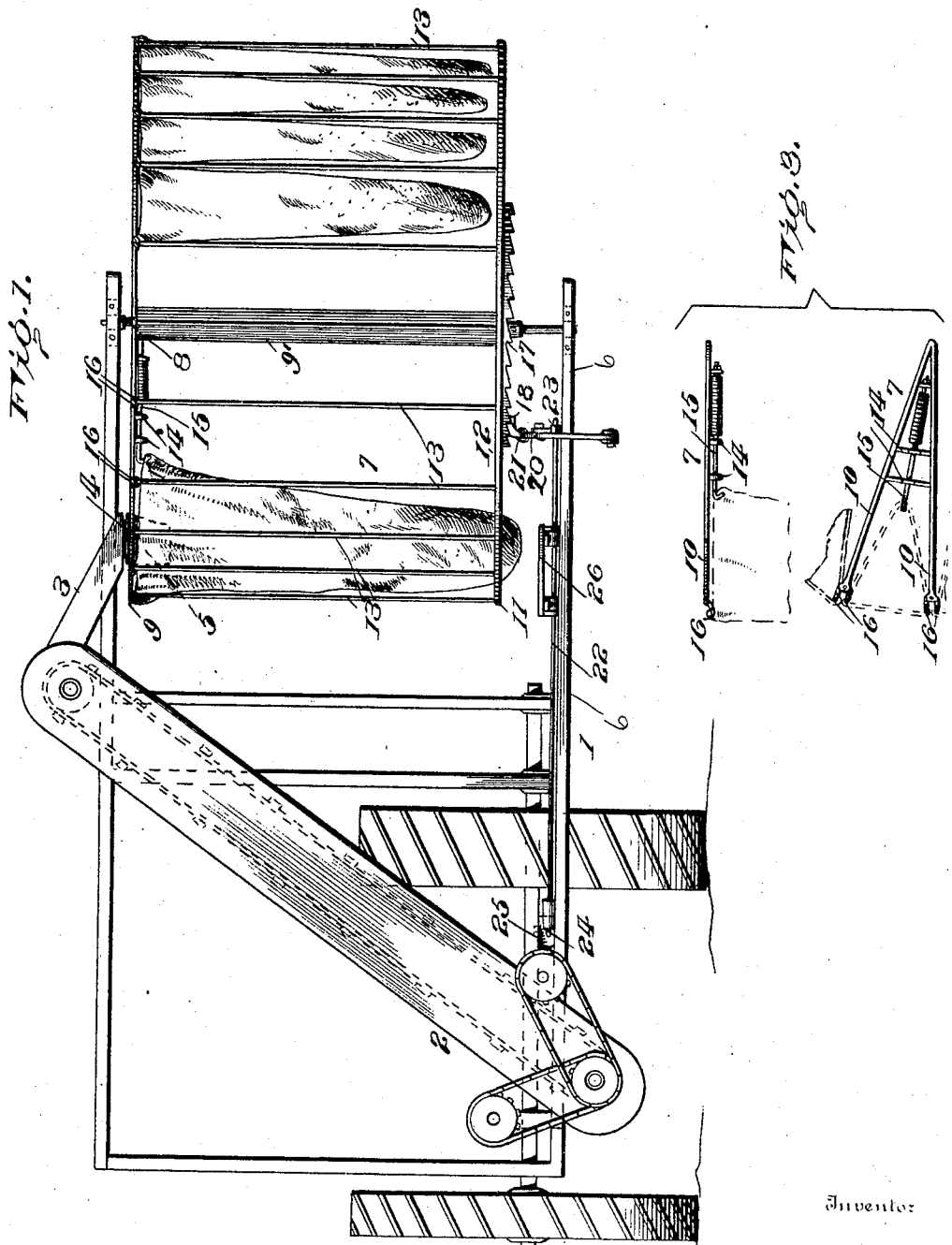

UNITED STATES PATENT OFFICE.

NELS LOFSTAM, OF DETROIT CITY, MINNESOTA.

VEGETABLE-SACKING DEVICE.

No. 796,082.      Specification of Letters Patent.      Patented Aug. 1, 1905.

Application filed September 26, 1904. Serial No. 226,023.

*To all whom it may concern:*

Be it known that I, NELS LOFSTAM, a citizen of the United States, residing at Detroit City, in the county of Becker and State of Minnesota, have invented new and useful Improvements in Vegetable-Sacking Devices, of which the following is a specification.

This invention relates to improvements in devices for sacking or bagging potatoes and similar vegetables; and it consists of a revolving sack-holder and ejecting means and mechanism for operating said sack-holder from said ejecting means and is adapted to be attached to a harvester and to present successively sacks or bags carried thereby at a predetermined point beneath the assorting-table of the harvester to receive the vegetables from said assorting-table and as the sacks are filled to eject them from the machine.

To this end the invention consists in the novel construction, arrangement, and combination of the several parts of the device, as hereinafter described, illustrated in the drawings, and particularly pointed out in the claims.

In the drawings, Figure 1 shows my device in elevation attached to a vegetable-harvester. Fig. 2 is a top view showing the sack-holding mechanism. Fig. 3 shows details of the sack-holding mechanism. Fig. 4 is a perspective view of the sack-holder-operating mechanism; and Fig. 5 is an end view of the sack-holder-operating mechanism, showing said mechanism in its normal position in full lines and in operative position in dotted lines.

Referring to the drawings, the numeral 1 indicates a potato or similar vegetable harvester of the usual type—such, for instance, as that shown in my application for a patent filed June 25, 1904, Serial No. 214,180.

The numeral 2 indicates an elevator, and 3 a combined chute and assorting-table, upon which the vegetables are delivered from said elevator. This combined chute and assorting-table is provided at its lower end with an opening 4 and a downwardly-swinging valve 5 for closing said opening.

The numeral 6 indicates a framing or support for the sacking device and is preferably an extension of the frame of the harvester 1.

The numeral 7 indicates a circular sack-holding device revolubly mounted in the framing or support 6, as shown, on the vertical shaft 8. This sack-holding device or skeleton drum 7 consists of an upper ring 9, held in position by the spokes 10, and the lower ring 11, which is held in position by the spokes 12. These rings 9 and 11 are held apart and in proper relative position by the vertical stays or supports 13. It is evident that these rings 9 and 11 may be otherwise braced to increase the rigidity of the skeleton drum, if so desired.

The numerals 14 14 indicate suitable guides carried by the spokes 10 and are located between the hub 9' and the ring 9, as shown. Mounted in the guides 14 14 are suitable spring-restrained rods 15, having their forward ends provided with downwardly-extending hooks for a purpose hereinafter stated. The ring 9 at its periphery is provided with lugs or projections 16 16, as shown. Sacks for the reception of vegetables are suspended between the spokes 10 10 and the ring 9 on the lug 16 16 and the hooked end of one of the spring-restrained rods 15 and held open thereby, as shown.

The numeral 17 indicates an annular toothed rack secured to the under side of the skeleton drum 7, and 18 is an angle-pawl pivoted at 19 on the bottom of the support 6 and adapted to engage the toothed rack 17. The numeral 20 indicates a holding-pawl pivoted to the lower end of the pawl 18 and is also adapted to engage the toothed rack 17.

21 indicates a coiled spring or other suitable means connecting the upper end of the pawl 18 with the upper end of the pawl 20 for the purpose of holding said pawls in engagement with the annular toothed rack 17, as is evident.

The numeral 22 indicates a shaft or rod mounted in the frame or support 6 and longitudinally thereof, but at about a right angle to the plane of the angle-pawl 18, and has one end rigidly secured to said pawl at 23, as shown, the opposite end of said rod or shaft 22 having an arm 24 at about right angles to said rod and provided with a balance-weight 25, said weight normally resting in the support 6, as shown. Rigidly secured on said rod or shaft 22 is a suitable tiltable platform 26, upon which the bottom of the sack rests while being filled and is directly below the opening 4 in the combined chute and assorting-table 3. The drum or sack-holding device 7 is so mounted that the opening of the sack being filled will be directly under the opening 4 of said chute, and the bottom of said sack will rest upon the tiltable platform, as shown.

It is evident that the sacks may be supplied with any suitable closure, so that when they are automatically ejected from the machine they will be closed to prevent the contents running out.

The operation of the device is as follows: The harvester being started, the vegetables will be dug and carried up into the digger and thence through the elevator onto the assorting-table and chute 3 in the usual manner. On the assorting-table stones, clods, and undesired vegetables are removed. The vegetables to be sacked will pass through the valved opening 4 of the combined chute and assorting-table into the sacks in the sack-holder. When the vegetables fall through said opening 4 into the sacks, the bottom of said sack will rest upon the tiltable platform 26, and when the required or predetermined weight of vegetables has been run into the sack, which weight is determined by the position of the adjustable weight 25 on the arm 24, said weight will be overcome, and the platform will tilt under the weight of the filled sack, and said sack will thereby be ejected from the device to the rear thereof, as is evident. As the platform tilts, the rod or shaft 22 will of course turn and in so doing draw the upper end of the angle-pawl 18 forward, and as said pawl is engaged with the annular rack secured on the bottom of the drum or sack-holder and will rotate said sack-holder a distance sufficient to place another sack below the opening 4 in the chute, and at the same time the pawl 20 will be released from its engagement with said rack and engage the next tooth thereof to the rear to hold said drum against backward movement. When the filled sack falls from the tiltable platform, the weight 25 will return the rod or shaft 22 to its former position and throw the angle-pawl 18 backward to engage another tooth of said annular rack 17, as is evident. As the sack-holder is moved it contacts with the downwardly-swinging valve 5 of the opening 4 and closes it, and when the next sack is brought into position under said opening 4 the valve 5 will again fall open and permit the vegetables in the chute to pass into the sack.

Having thus fully described my invention, what I claim, and desire to secure by Letters Patent, is—

1. The combination with the assorting-table of a vegetable-harvester having an opening therein, and a valve for said opening, of a revoluble sack-holder, a tilting platform, and mechanism between said platform and said sack-holder for revolving said sack-holder to present a sack beneath the opening in the assorting-table and to close said valve during such movement.

2. The combination with the assorting-table of a vegetable-harvester having an opening therein, and a downwardly-swinging valve for said opening, of a revoluble sack-holder, a tilting platform, and mechanism between said platform and said sack-holder, for revolving said sack-holder to present a sack beneath the opening in the assorting-table and at the same time causing said valve to close.

3. The combination with the assorting-table of a vegetable-harvester having an opening therein, and a downwardly-swinging valve for said opening, of a revoluble sack-holder, a supporting-frame therefor, an annular ratchet secured to the bottom of said holder, a rod mounted on said support carrying a suitable platform, and means secured to said rod and engaging said annular ratchet for revolving said sack-holder and means closing said valve upon the tilting of said platform.

4. The combination with the assorting-table of a vegetable-harvester having an opening therein, and a valve for said opening, of a revoluble sack-holder, a supporting-frame therefor, an annular ratchet secured to the bottom of said sack-holder, a tilting platform mounted in said support, an angle-pawl connected with said platform, a pawl connected to said angle-pawl, said pawls being adapted to engage the annular ratchet on the sack-holder to operate the same to present sacks successively beneath the opening in the assorting-table and to cause said holder to close the valve while one sack is removed and another presented.

5. In a device of the character described, the combination with a revoluble sack-holder, a support therefor, and an annular ratchet secured on the bottom of said holder, of a platform tiltably mounted on said support, an angle-pawl rigidly connected with said tiltable platform and mounted on said support, a pawl hinged to said angle-pawl at its lower end, said pawls being adapted to engage the annular ratchet, and means connecting said pawls to hold them in engagement with said ratchet, all constructed and arranged substantially as and for the purpose set forth.

In testimony whereof I affix my signature in presence of two subscribing witnesses.

NELS LOFSTAM.

Witnesses:
S. D. ENSIGN,
WM. J. MORROW.